(12) United States Patent
Casper

(10) Patent No.: US 9,173,532 B2
(45) Date of Patent: Nov. 3, 2015

(54) PET VACUUM CLEANER

(76) Inventor: Robert W. Casper, North Chatham, MA (US)

( * ) Notice: Subject to any disclaimer, the term of this patent is extended or adjusted under 35 U.S.C. 154(b) by 1802 days.

(21) Appl. No.: 12/355,352

(22) Filed: Jan. 16, 2009

(65) Prior Publication Data

US 2010/0180398 A1 Jul. 22, 2010

(51) Int. Cl.
| | |
|---|---|
| A47L 5/24 | (2006.01) |
| A47L 5/10 | (2006.01) |
| A47L 5/26 | (2006.01) |
| A47L 5/00 | (2006.01) |
| A47L 9/06 | (2006.01) |
| A47L 9/14 | (2006.01) |
| A01K 13/00 | (2006.01) |

(52) U.S. Cl.
CPC .............. *A47L 5/24* (2013.01); *A01K 13/001* (2013.01); *A01K 13/002* (2013.01); *A47L 5/26* (2013.01); *A47L 9/1409* (2013.01)

(58) Field of Classification Search
CPC ............ A47L 5/24; A47L 5/26; A47L 9/1409
USPC .................... 15/344, 396, 397, 402, 383, 385
See application file for complete search history.

(56) References Cited

U.S. PATENT DOCUMENTS

| | | | | |
|---|---|---|---|---|
| 1,786,384 A | * | 12/1930 | Amstutz | 15/344 |
| 2,802,260 A | * | 8/1957 | Allen | 30/41.5 |
| 4,089,110 A | * | 5/1978 | Rasco | 30/41.5 |
| 4,218,806 A | * | 8/1980 | Cohn | 15/402 |
| 4,799,460 A | | 1/1989 | Kuhl | |
| 5,074,006 A | * | 12/1991 | Eremita | 15/344 |
| 5,211,131 A | | 5/1993 | Plyler | |
| 5,373,607 A | * | 12/1994 | Hwang | 15/344 |
| 5,462,018 A | | 10/1995 | Louison | |
| 5,655,481 A | * | 8/1997 | Trahan | 119/606 |
| 5,826,300 A | * | 10/1998 | Smith | 15/402 |
| 5,909,928 A | * | 6/1999 | Barish | 30/41.5 |
| 6,189,178 B1 | * | 2/2001 | Roberts | 15/323 |
| 6,336,428 B1 | | 1/2002 | Locke | |
| 6,938,344 B2 | * | 9/2005 | Zuidervaart et al. | 30/34.2 |
| 7,377,001 B2 | | 5/2008 | McKay | |
| 2006/0265822 A1 | * | 11/2006 | McKay | 15/23 |
| 2007/0151052 A1 | | 7/2007 | McKay | |
| 2007/0151053 A1 | | 7/2007 | McKay | |

* cited by examiner

*Primary Examiner* — Bryan R Muller

(74) *Attorney, Agent, or Firm* — St. Onge Steward Johnston & Reens LLC

(57) ABSTRACT

A hand-held cleaning device that utilizes a low-power, low-torque motor coupled to an impeller for creating a vacuum. The device includes a contact head having a plurality of protrusions formed on its top surface. The contact head contacts the surface to be cleaned, for example, the coat of a pet. The protrusions are sized and spaced to avoid tangling or clumping of pet hair. The device includes a container for collecting hair and debris. The impeller includes ribs on a disk portion thereof for increasing the efficiency of the vacuum system.

19 Claims, 6 Drawing Sheets

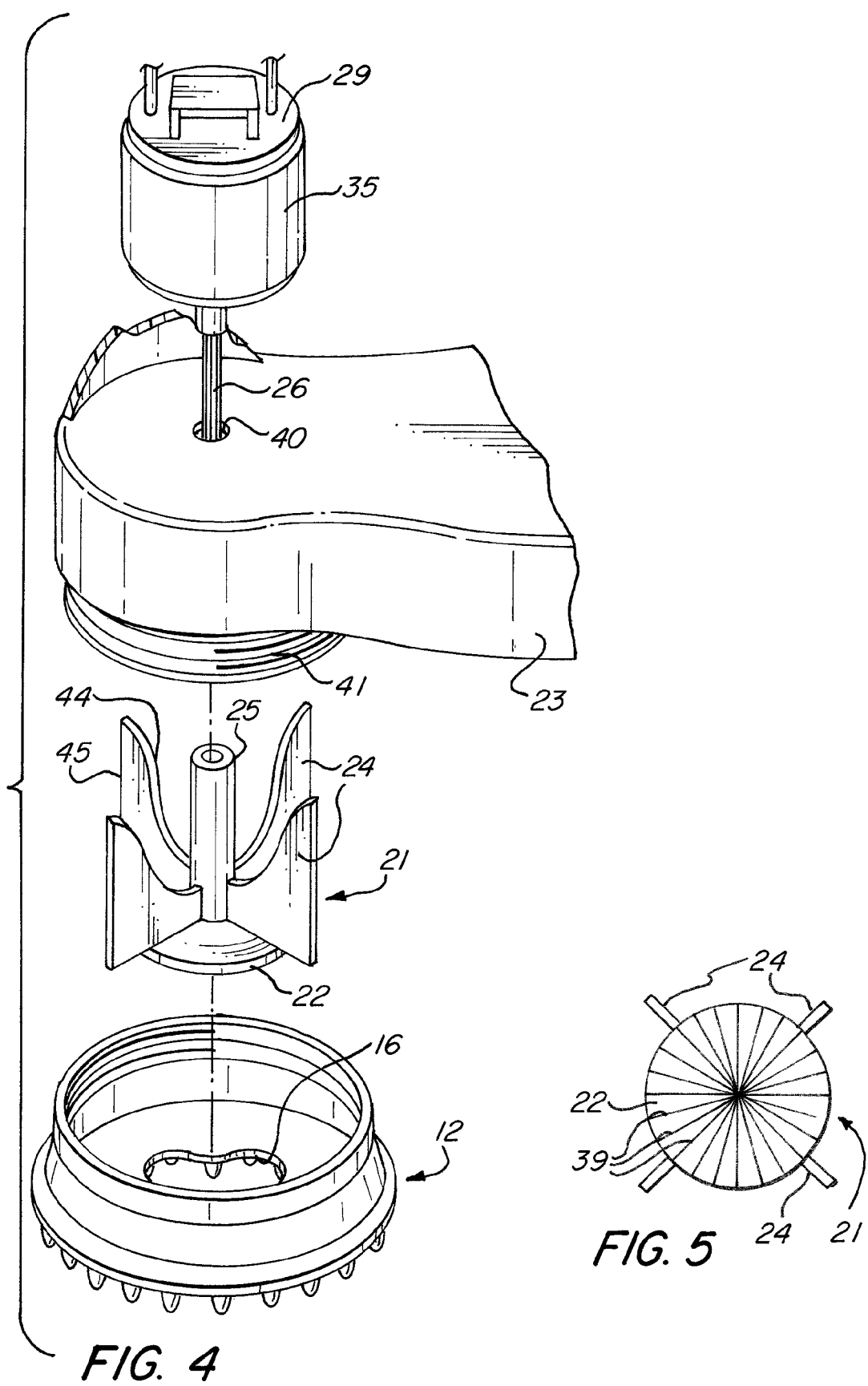

PET VACUUM CLEANER

FIELD OF THE INVENTION

The present invention relates to a cleaning device. Specifically, the present invention relates to a hand-held cleaning device that is advantageously used on pets and other animals.

BACKGROUND OF THE INVENTION

Pet ownership is widespread in most parts of the world, and many pet owners spend a considerable amount of time grooming and cleaning up after their pets. For example, many "short-hair" pets are prone to "shedding." This is the term for the normal and systematic loss of hair by the animal. For some animals, a large volume of hair is shed at certain times during the year, while some animals seem to shed piles of hair at a constant rate.

Many pet owners go to long lengths to control the amount of pet hair that accumulates in their home, car, etc. Shed pet hair is generally perceived as unhygienic and may reflect poorly on a pet owner's cleanliness in the eyes of their colleagues. Pet hair also can cause or exacerbate allergic reactions in pet owners or those that visit their homes.

One typical first step in controlling pet hair is to brush the coat of the pet with a hand-held brush or comb which causes the pet's hair to be loosened from the pet and either collected in the bristles of the brush or released to the ground nearby. In the typical second step, the pet owner will then clean the brush or comb and vacuum the area to dispose of the loosened hair. As many pet owners can attest, this can be a time consuming chore, and one that must be repeated on a weekly or bi-weekly basis.

Many attempts to simplify the management of pet hair have been made in the past. In particular, many have attempted to combine the brushing and vacuuming steps by providing a device that performs both tasks simultaneously. In general, such a device includes a brush or comb portion for running over the animal's coat and an attached vacuum portion for collecting hair and debris loosened by the brush portion. Of course, such devices are in many ways similar to the various hand-held vacuum cleaners known in the art. For example, U.S. Pat. No. 1,786,384 to Amstutz describes a hand-held vacuum brush having a bottom plate with a ring of bristles. The device uses an electric motor to draw debris into a bag.

Pet hair behaves in a considerably different manner than typical household dirt and dust, and thus requires any vacuum intended to collect it to have unique characteristics and capabilities in order to be effective. Many difficulties have been encountered in designing such devices to effectively handle the substantial quantity of hair generated by the pet. One example of a pet grooming device is given by U.S. Pat. No. 5,211,131 to Plyler. This device includes a vacuum system and a detachable head with a plurality of individually spaced bristles. The bristles are long and thin and include a tiny ball-like outer tip end. The vacuum system includes a motor for drawing hair, ticks and fleas into a collection bag.

U.S. Pat. No. 5,462,018 to Louison also discloses a device intended for grooming pets. The device has a suction means and a brush. The brush includes scratching teeth and combing teeth, which loosen and groom an animal's hair. The suction means serves to press the loosened hair against a collection grill, through which the teeth extend. Cleaning the device after use requires that the grill be removed from the grill and the hairs then removed from the grill.

U.S. Pat. No. 5,655,481 to Trahan discloses a hand-held pet grooming apparatus having a generally cylindrical shape. Individually spaced bristles are provided on the lower end of the device for engaging pet hair. A vacuum is created in a vacuum chamber by a battery operated mechanism, and hair and other debris is drawn into the vacuum chamber and retained by a hair catch member which has a porous-type material to separate the vacuum chamber from the air chamber Unfortunately, it has been found that the devices of the prior art intended to aid pet owners in grooming and cleaning their pets have significant shortcomings. For instance, it is often the case that brush or comb teeth or bristles do not provide sufficient loosening of a pet's hair. Brush or comb teeth may be advantageously used to separate hair, but not necessary to loosen and remove hair. The teeth or bristles are also often designed such that they collect a tangled mass of hair between them, preventing this hair from being collected by the vacuum means. The result is that the user must repeatedly clean the teeth or bristles. The teeth or bristles also often cause pain or irritation to the pet.

It has also been found that many devices are inconvenient to clean. The use of a collection bag significantly complicates the cleaning of the device, as many parts must be opened or disassembled in order to prepare the device for an additional use after the collection bag is filled.

It has further been found that the devices of the prior art are designed such that the vacuum means are relatively weak and/or require frequent replacement of batteries. Pets are often fearful of loud noises, and many vacuum systems are relatively loud. In general, low-power/low-torque motors must be used for vacuums to be employed on pets. Vacuum systems with such motors have been known to perform poorly due to inefficiencies in the design of the vacuum system. A low-power/low-torque motor requires extremely efficient components in order to generate a sufficiently strong vacuum in a device small enough to be hand-held.

What is desired, therefore, is a cleaning device that loosens debris and hair so that the debris and hair can be collected by a vacuum. It is further desired that the device be capable of dislodging hair without causing the hair to become tangled or clumped together. It is further desired that the device be easy to clean and prepare for subsequent use. It is yet further desired that the device not cause pain or irritation to a pet. It is still further desired that the device be efficiently designed so as to maximize the capabilities of a low power and low torque electric motor. It is also desired that the device be hand-held and easy to use.

SUMMARY OF THE INVENTION

It is an object of the present invention to provide a cleaning device that effectively dislodges hair and debris for collection by a vacuum system.

It is a further object of the present invention to provide a cleaning device that will not cause pain or irritation to the pet.

It is yet a further object of the present invention to provide a cleaning device that is easy to clean and prepare for additional uses.

It is still a further object of the present invention to provide a cleaning device that is efficiently designed so as to maximize the capabilities of a low-power and low-torque electric motor.

It is yet a further object of the present invention to provide a cleaning device that is hand-held and easy to use.

According to a first embodiment of the present invention, a hand-held cleaning device is provided. The device comprises: a housing having a swirl chamber; an impeller mounted in the swirl chamber; a motor for driving the impeller; and a contact head mounted to the housing upstream of the impeller for loosening debris to be collected by the device. The contact head comprises a contact surface with a plurality of protrusions formed thereon. The ratio of the height of each protrusion to the width of each respective protrusion at its widest portion is less than 2.

In some embodiments, the ratio of the height of each protrusion to the width of each respective protrusion at its widest portion is less than 1. In some embodiments, the ratio of the height of each protrusion to the distance to the nearest adjacent protrusion is less than 1. In some embodiments, the contact head is in the shape of a ring, and debris is drawn by the impeller through the center opening of the ring. In some embodiments, the swirl chamber includes an opening out of which debris is blown by the impeller, and the opening is coupled to a collection container removably mounted to the housing, which collection container collects debris that is blown from the swirl chamber.

In some embodiments, the contact head is formed of flexible thermoplastic or rubber material. In some embodiments, the motor is a low-torque electric motor. In some embodiments, the motor is driven by at least one battery that is rechargeable via an electrical circuit integral with the cleaning device. In some embodiments, the impeller comprises a disk portion that has a top surface that includes at least one rib extending from the center of the disk portion to the edge of the disk portion.

According to a second embodiment, a hand-held cleaning device is provided. The device comprises: a housing having a swirl chamber; an impeller mounted in the swirl chamber; a motor for driving the impeller; a contact head for loosening debris to be collected by the device; and a collection container having a first end and a second end. The first end of the collection container includes a first opening that is coupled to the swirl chamber for receiving debris and the second end includes a hinged door for closing a second opening in the collection container. The collected debris may be evacuated from the collection container when the hinged door is open.

In some embodiments, the collection container comprises at least four surfaces having vent holes formed therein. In some embodiments, the hinged door comprises at least one surface having vent holes formed therein. In some embodiments, the collection container is detachably connected to the housing. In some embodiments, the motor is a low-torque electric motor. In some embodiments, the motor is driven by at least one battery that is rechargeable via an electrical circuit integral with the cleaning device. In some embodiments, the impeller comprises a disk portion, which has a top surface that includes at least one rib extending from the center of the disk portion to the edge of the disk portion.

According to a third embodiment, a hand-held cleaning device is provided. The device comprises: a housing having a swirl chamber; a low-torque electric motor; at least one source of electric power connected to the motor; and an impeller coupled to the motor and disposed in the swirl chamber. The impeller comprises a disk portion and a plurality of impeller blades attached to a bottom surface of the disk portion. The top surface of the disk portion includes at least one rib extending from the center of the disk portion to the edge of the disk portion. In some embodiments, the ribs are in the form of grooves. In some embodiments, the ribs are in the form of ridges. For purposes of this specification, the term "rib" shall mean a longitudinal feature, which includes ridges formed on an object and grooves formed in an object.

The invention and its particular features and advantages will become more apparent from the following detailed description considered with reference to the accompanying drawings.

BRIEF DESCRIPTION OF THE DRAWINGS

FIG. 4 is an exploded view of a portion of the cleaning devices shown in FIGS. 1-3.

FIG. 5 is a bottom view of a part used in the cleaning devices shown in FIGS. 1-3.

DETAILED DESCRIPTION OF THE INVENTION

Figure 1:
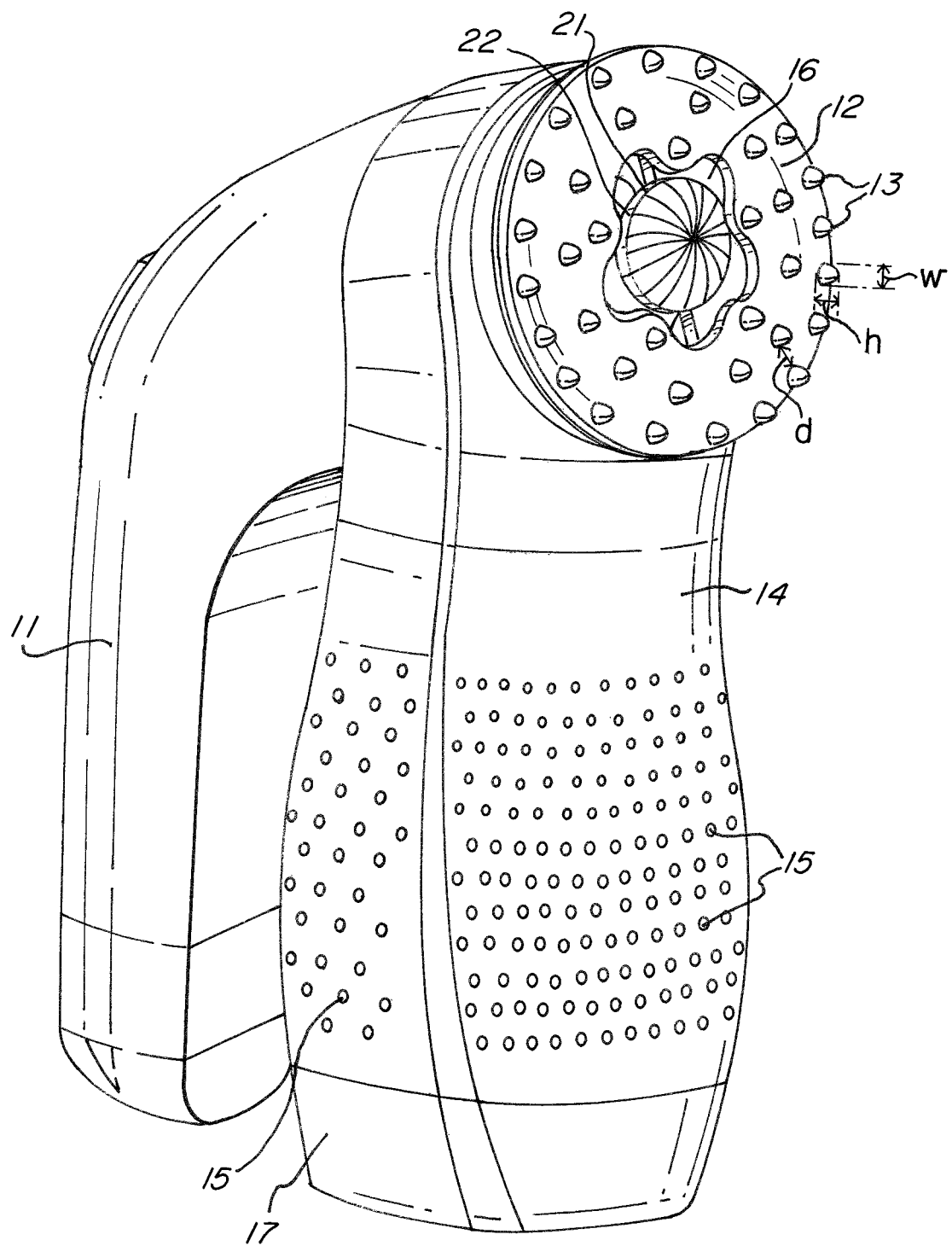
FIG. 1 is a perspective view of a first embodiment of a cleaning device according to the present invention.

Embodiments of the present invention will now be described with reference to the attached drawings. FIG. 1 shows a first exemplary embodiment of a cleaning device according to the present invention. The cleaning device 10 is hand-held, and includes a handle 11 for grasping by a single hand of a user. The device 10 also has a contact head 12, which includes a plurality of protrusions 13. Below the contact head 12 in FIG. 1 is a collection container 14. The collection container 14 has a plurality of holes 15.

Figure 3:
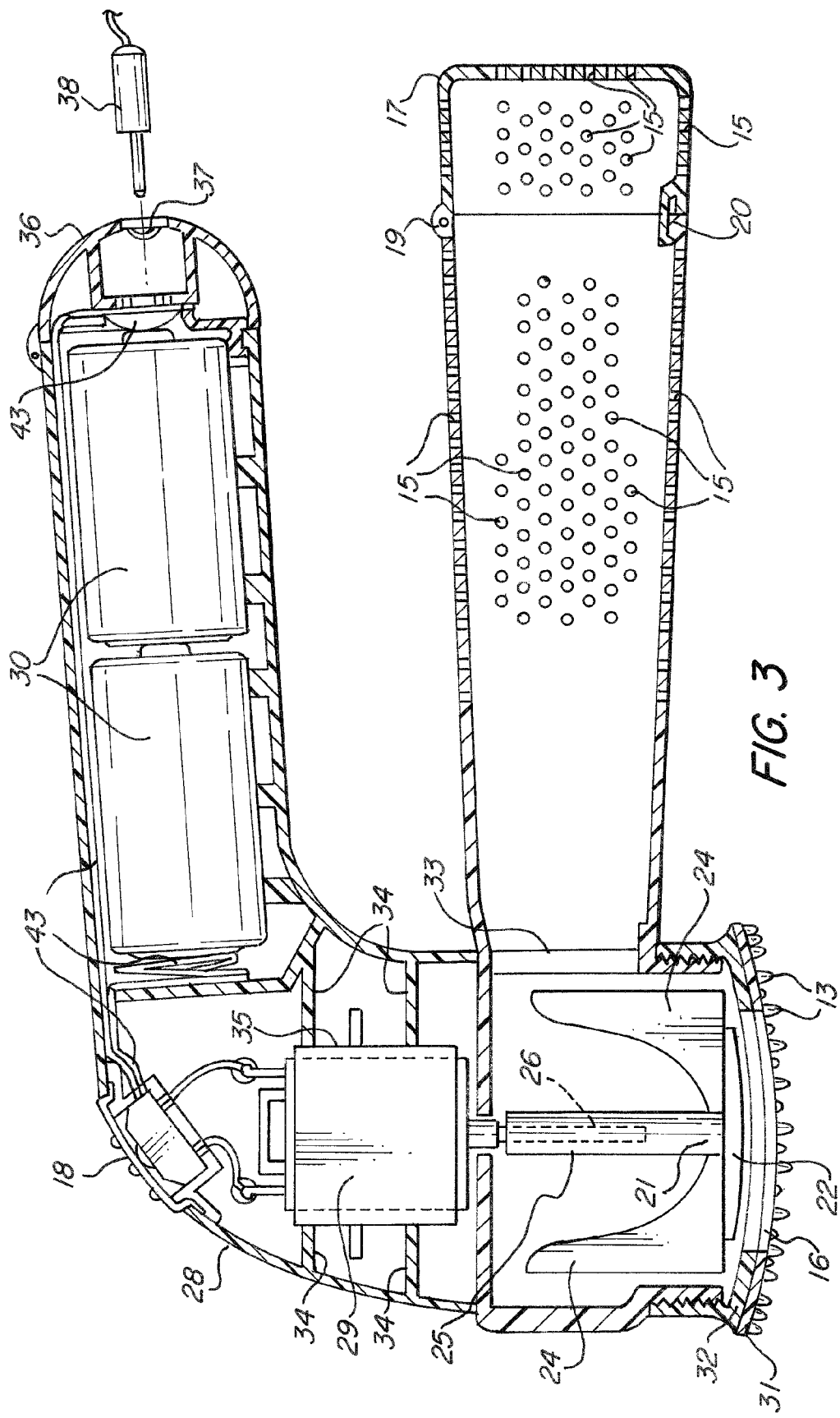
FIG. 3 is a cross-section view of a second embodiment of a cleaning device according to the present invention.

The contact head 12 has an opening 16 at or near its center. Through opening 16, the disk portion 22 of the impeller 21 can be seen. The impeller 21 will be described in more detail below. The impeller 21 is driven by a motor so that it rotates and creates a vacuum. The internal parts of device 10 are shown in FIG. 3, which is a cross-sectional view and is described below.

The contact head 12 is intended to contact the surface to be cleaned by the device, for example, the coat of an animal. In the embodiment shown in FIG. 1, the protrusions 13 are small and in the form of roundish cones. The protrusions are arranged in a pattern on the contact head 12. The protrusions 13 dislodge loosened hair and debris as the contact head 12 is pulled across the animal's coat. The dislodged hair and debris is then sucked into the opening 16 and moved into the collection container 14. The protrusions 13 are designed to dislodge hair but not to allow hair to become entangled between and around them. Such entanglement is known to impede the collection of the hair by preventing the hair from being sucked up by the vacuum. The protrusions 13 are also designed so that they do not grab and pull hair that is still securely rooted to the animal's skin. The protrusions 13 are intended only to dislodge hair that has already been released by the root, or that is only weakly held to the skin. The protrusions 13 are not intended to remove healthy, strong hair from the animal's coat.

Figure 7:
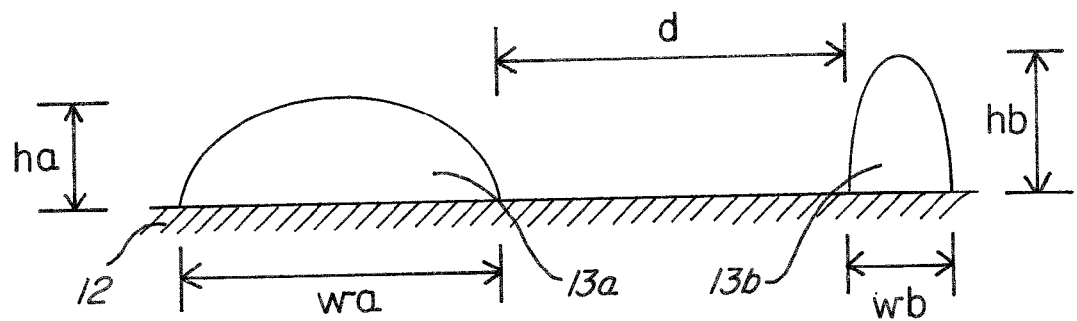
FIG. 7 is a schematic view of the contact head protrusions used in embodiments of the present invention.

In order to obtain the intended design and function of the protrusions 13, the height, width, and spacing of the protrusions must be carefully selected. Shown in FIGS. 1 and 7 is the height 'h' and width 'w' of the protrusions, as well as the spacing 'd' between two protrusions. It should be understood that the height 'h' refers to the height of a particular protrusion, while the width 'w' refers to the width of that protrusion at its widest portion. The spacing 'd' refers to the largest distance separating one protrusion and the nearest second protrusion. In accordance with the present invention, the ratio of protrusion height to protrusion width at its widest portion (h/w) is less than 2. In many embodiments, the ratio (h/w) is less than 1. This ratio helps to prevent the entanglement and clumping of hairs around the protrusions 13. The ratio of the height of a protrusion 13 to the distance to the nearest adjacent protrusion (h/d) is also important. In accordance with the present invention, the ratio (h/d) is less than 1. In many embodiments, the ratio (h/d) is less than 1. A further useful ratio is the ratio between the height of each protrusion to the average of the distances between each protrusion and all protrusions adjacent to that protrusion. It is advantageous when this ratio is less than 2.

FIG. 7 shows a schematic view of the relationships between the height, width, and separation of the protrusions. Two protrusions 13a and 13b of differing sizes are shown. Protrusion 13a has a height of ha and a width of wa. Protrusion 13b has a height of hb and a width of wb. The protrusions are separated by a distance d. The h/w ratio of protrusion 13a (ha/wa) is 1/3. The h/w ratio of protrusion 13b (hb/wb) is near the limit of 2: it is 4/3. The h/d ratio from protrusion 13a to 13b (ha/d) is 0.3 (3/10). The h/d ratio from protrusion 13b to 13a (hb/d) is 0.4 (4/10).

In most embodiments of the present invention, all of the protrusions 13 on the contact head 12 have substantially the same size and shape. In some embodiments, however, the height, width, and separation of the protrusions 13 varies across the contact head 12. In either case, by designing the protrusions 13 to maintain one or both of the ratios h/w and/or h/d, the clumping or tangling of the pet's hair is nearly impossible.

The contact head 12 is generally ring-shaped. The opening 16 shown in FIG. 1 is the shape of a five-point star with rounded points. In other embodiments, the opening 16 is circular, square, or any other suitable, desired shape. The selection of the shape is made to maximize the efficiency with which the motor and impeller create a vacuum, balanced with providing the contact head with enough surface area and protrusions to perform its task of dislodging hair and debris.

The collection container 14 is shown with two surfaces having holes 15. The hair and debris that is dislodged by the contact head 12 and sucked up by the vacuum created by the impeller is deposited inside this container 14. Generally, a large number of holes allows for the most airflow out of the container 14, which maximizes the effectiveness of the motor and impeller. In some embodiments of the present invention, the collection container 14 has four surfaces with holes 15.

Figure 2:
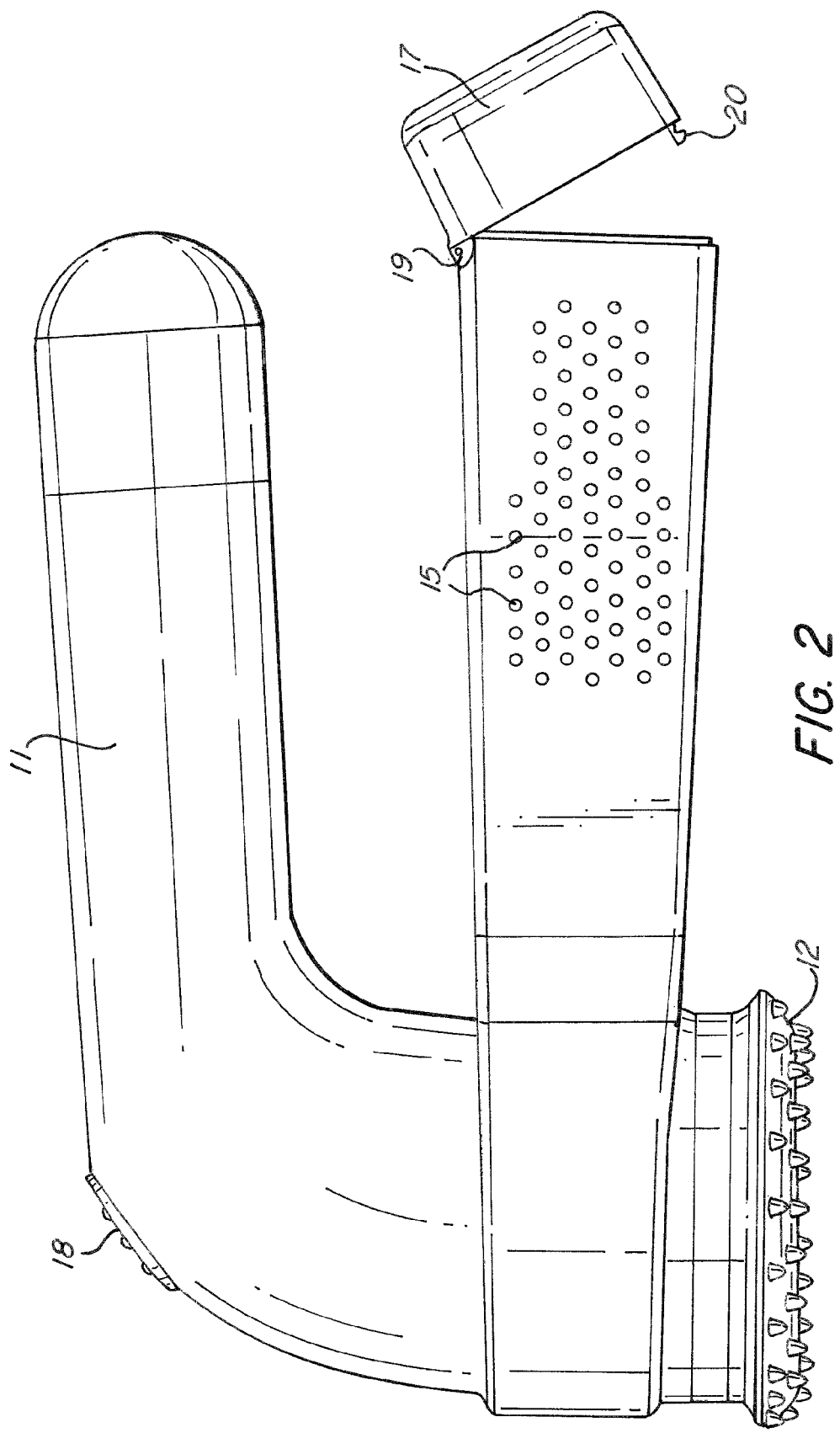
FIG. 2 is a side view of the cleaning device shown in FIG. 1.

In the embodiment shown in FIGS. 1 and 2, there is a hinged door 17 at the bottom of the collection container 14. Opening this door 17 allows the contents of the collection container 14 to be evacuated. FIG. 1 shows the door 17 in a closed position. FIG. 2 (a side view of the first embodiment of the present invention) shows the door 17 in an open position, with a hinge 19 and a latch 20. In some embodiments, the surfaces of the door 17 are also provided with holes 15. The hinged door 17 allows for the device 10 to be quickly and easily emptied of collected hair and debris. To empty the collection container 14, the user simply opens the hinged door and switches the motor on. This causes the hair and debris in the collection container to be blown out. FIG. 2 also shows a switch 18 for turning on and off the motor that drives the impeller. The switch 18, in the embodiment shown, is a simple sliding switch. Handle 11 is shown in FIG. 2 as being a comfortable size for holding with a single hand.

FIG. 3 is a cross-section view of a second embodiment and shows many additional details of the present invention. This second embodiment is substantially similar to the first embodiment shown in FIGS. 1 and 2, but includes additional vent holes 15 in the hinged door 17. The device 10 comprises a lower housing 23, which forms the collection container 14 and a swirl chamber 27. In some embodiments, the collection container 14 is integral with the housing, while, in other embodiments, the collection container 14 is a separate structure that couples to the housing. Mounted to the lower housing 23 is the upper housing 28, which holds the motor 29 and power source, which, in the embodiment shown in FIG. 3, is a set of two batteries 30 in series.

The contact head 12 is mounted upstream of the swirl chamber 27, and comprises two parts: a flexible ring 31 and a mounting collar 32. The flexible ring 31 carries the protrusions 13 and is generally made from a flexible thermoplastic or rubber material. The flexible ring is attached to the mounting collar 32, which, in the embodiment shown, is threaded onto the lower housing 23. In other embodiments, the flexible ring portion of the contact head is mounted directly to a housing such as the lower housing 23.

Inside the swirl chamber 27 is the impeller 21. The impeller 21 has a disk portion 22 and a plurality of blades 24 attached to the disk portion 22. Both the disk portion 22 and the blades 24 are attached to sleeve 25, which is mounted on driveshaft 26 of motor 29. The blades 24 are shaped so that, when the impeller is rotated rapidly, air is forced through the opening 33 and into the collection container 14 from the swirl chamber 27. Air flows out of the collection container 14 through holes 15, which are, in this embodiment, formed in four surfaces of the collection container-portion of the housing 23 (only three are visible in FIG. 3) as well as on five of the surfaces (only four are visible in FIG. 3) of the hinged door 17.

The motor 29 is secured in the upper housing 28 via an insulating sleeve that "double mounts" to the supports 34. The motor 29 is a low-torque electric motor, which requires a relatively small amount of power. Such a motor will generally run quieter—and be less likely to upset the animal—than other, more powerful motors. Power is supplied by the batteries 30, which, in the embodiment shown in FIG. 3, are rechargeable, nickel-cadmium C-cells. In other embodiments, disposable batteries, externally rechargeable batteries, and/or batteries of different size are used to power the motor 29. Because the embodiment shown in FIG. 3 includes rechargeable batteries, it is provided with a means for supplying the batteries with electricity from an external source. The electric circuitry 43 supports the electrical components required by the system. The end cap 36 is hingedly connected to the upper housing 28, and includes an input port 37 for receiving a power input connector 38. The end cap 36 is connected by a hinge so that the batteries 30 may be removed and replaced in the event that they become permanently worn out.

FIG. 4 shows an exploded view of the components of the device 10 necessary for creating the vacuum effect. The driveshaft 26 of the motor 29 is pushed through a hole 40 in the lower housing 23 and into sleeve 25 of the impeller 21. The contact head 12 engages threads 41 on the upper housing 41 for mounting the contact head 12 to the lower housing 23.

The impeller 21 has four blades 24. The blades 24 have a curved inner edge 44, which aids the efficiency of the impeller 21. The blades 24 shown in FIG. 4 also have a straight outer edge 45. Many different shapes of the blades 24 and the edges 44 and 45 are employed in embodiments of the present invention. The design of the blades 24 is selected in relation to the design of the remaining parts of the device (e.g. the swirl chamber 27) in order to maximize the efficiency of the vacuum system.

FIG. 5 is a bottom view of the impeller 21, and shows another feature of the present invention that is included in some embodiments. The disk portion 22 has a plurality of ribs 39 extending radially from the center of the impeller to the edge of the disk. The ribs 39 are shown in FIG. 5 as straight lines, but in some embodiments, the ribs 39 are curved. The ribs 39 are formed by making grooves in the disk portion 22 or by making ridges on the surface of the disk portion 22. In some embodiments, a combination of both grooves and ridges is used. The use of ribs 39 on the disk portion has been found to enhance the vacuum-creating effect of the impeller and to help guide hair and debris from the contact head, through the swirl chamber, and into the collection container. In other embodiments, the top surface of the disk portion 22 does not include ribs, but instead is made with a grainy roughness. The graininess also enhances the vacuum-creating effect of the impeller. In still other embodiments, both ribs and graininess are used on the disk portion 22 of the impeller.

Figure 8:
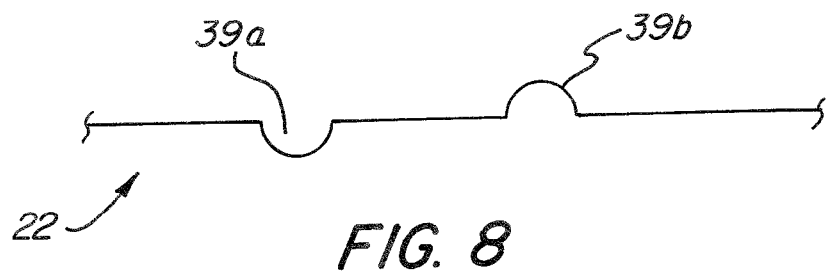
FIG. 8 is a schematic view of a portion of the impeller used in embodiments of the present invention.

FIG. 8 shows a schematic cross section view of the ribs used on the disk portion 22 of the impeller 21. Rib 39a is in the form of a groove, which runs perpendicular to the plane of the figure. Rib 39b is in the form of a ridge, which also runs perpendicular to the plane of the figure. As stated above, in some embodiments all of the ribs 39 are in the form of grooves, while, in other embodiments, all of the ribs 39 are in the form of ridges. In still other embodiments, a combination of grooves and ridges are used on the impeller as the ribs 39.

Because the motor 29 is a low torque motor for safety purposes, it is important that the components of the vacuum system be as efficient as possible. The ribs 39 on the impeller 21 and the large number of holes 15 on the collection container 14 are features that enhance the performance of the vacuum system. These help obtain the most efficient use of the motor 29.

To use the first embodiment to groom a pet, one must first ensure that the batteries 30 have a sufficient electric charge to run the motor 29 during the cleaning. This is accomplished by connecting the cleaning device 10 to the external power source 38 for a sufficient length of time. Once the batteries are deemed ready, the user simply slides the switch 18 into the "on" position, which activates the motor. Then, the user gently brushes the animal's coat with the contact head 12. The user may employ a circular brushing motion or long, linear strokes, depending on the animal's preference and the part of the animal being cleaned.

The animal's loose hair and any debris that may have been clinging to the animal's coat will be sucked up by the vacuum and deposited in the collection container 14. Once it becomes necessary to empty the collection container 14, either after finishing cleaning the animal or during the cleaning, the user simply holds the device 10 over a wastebasket, opens the hinged door 17, and the pressure in the container created by the impeller 21 will blow the collected hair and debris out of the container 14 and into the wastebasket. The user may then continue cleaning or store the device 10 for a future use.

Figure 6:
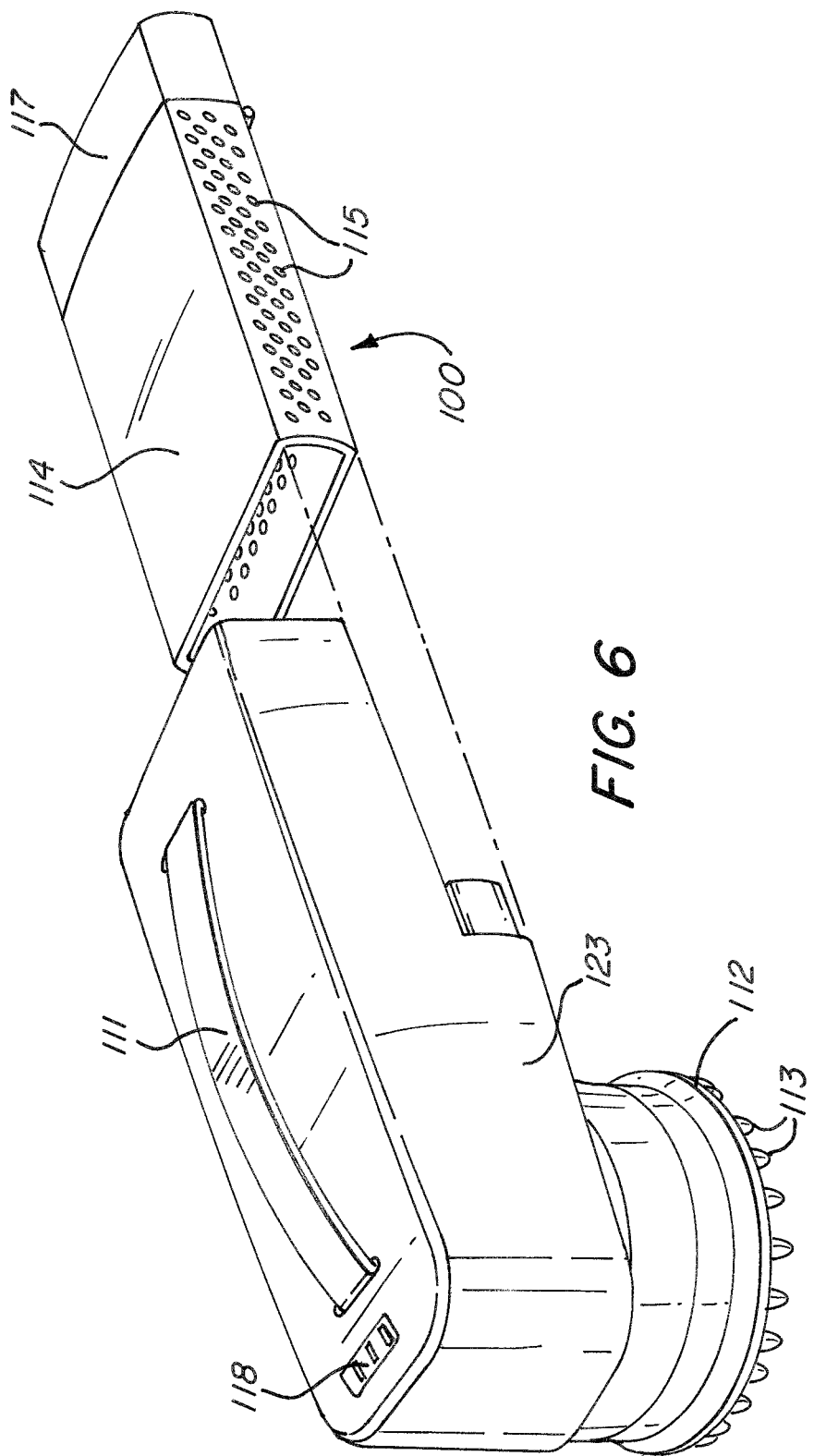
FIG. 6 is a perspective view of a third embodiment of a cleaning device according to the present invention.

FIG. 6 is a perspective view of a third exemplary embodiment of the present invention. The cleaning device 100 is slightly more compact than the embodiments shown in FIGS. 1-3. The device 100 includes a contact head 112 having protrusions 113, a handle 111, and a collection container 114 having holes 115. In most respects, device 100 operates the same as the device of the previously described embodiment. However, the collection container 114 of device 100 is structurally distinct from the housing 123 and is detachable from the housing 123 to allow for easier and more thorough cleaning if necessary. The collection container 114 of this embodiment also includes a hinged door 117 for quickly evacuating the container 114, as in the first and second embodiments.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A hand-held cleaning device, comprising:
a housing having a swirl chamber;
an impeller mounted in the swirl chamber;
a motor for driving the impeller; and
a contact head mounted to the housing upstream of the impeller for loosening debris to be collected by the device, said contact head comprising a contact surface having a plurality of protrusions formed thereon, wherein the ratio of the height of each protrusion to the width of each respective protrusion at its widest portion is less than 1.

2. The cleaning device of claim 1, wherein the ratio of the height of each protrusion to the distance to the nearest adjacent protrusion is less than 1.

3. The cleaning device of claim 1, wherein the contact head is in the shape of a ring, and wherein debris is drawn by the impeller through a center opening of the ring.

4. The cleaning device of claim 3, wherein the swirl chamber includes an opening out of which debris is blown by the impeller, and wherein the opening is coupled to a collection container, which collects debris that is blown from the swirl chamber.

5. The cleaning device of claim 4 wherein the contact head is formed of flexible thermoplastic or rubber material.

6. The cleaning device of claim 1, wherein the motor is an electric motor.

7. The cleaning device of claim 6, wherein the motor is driven by at least one battery that is rechargeable via an electrical circuit integral with the cleaning device.

8. The cleaning device of claim 1, wherein the impeller comprises a disk portion, said disk portion having a top surface that includes at least one rib extending from the center of said disk portion to the edge of said disk portion.

9. A hand-held cleaning device, comprising:
a housing having a swirl chamber;
an impeller mounted in the swirl chamber;
a motor for driving the impeller;
a contact head mounted to the housing upstream of the impeller for loosening debris to be collected by the device, said contact head comprising a contact surface having a plurality of protrusions formed thereon; and
a collection container having a first end and a second end, wherein the first end includes a first opening that is coupled to the swirl chamber for receiving debris and wherein the second end includes a hinged door for closing a second opening, wherein collected debris may be evacuated from the collection container when the hinged door is open.

10. The cleaning device of claim 9 wherein the collection container comprises at least four surfaces having vent holes formed therein.

11. The cleaning device of claim 9 wherein the hinged door comprises at least one surface having vent holes formed therein.

12. The cleaning device of claim 9 wherein the collection container is detachably connected to the housing.

13. The cleaning device of claim 9, wherein the motor is an electric motor.

14. The cleaning device of claim 13, wherein the motor is driven by at least one battery that is rechargeable via an electrical circuit integral with the cleaning device.

15. The cleaning device of claim 9, wherein the impeller comprises a disk portion, said disk portion having a top surface of which includes at least one rib extending from the center of said disk portion to the edge of said disk portion.

16. A hand-held cleaning device, comprising:
   a housing having a swirl chamber;
   an electric motor;
   at least one source of electric power connected to the motor;
   an impeller coupled to said motor and disposed in said swirl chamber, comprising a disk portion and a plurality of impeller blades attached to a bottom surface of said disk portion;
   wherein a top surface of said disk portion includes at least one rib extending from the center of said disk portion to the edge of said disk portion.

17. The cleaning device of claim 16, wherein a plurality of ribs extend from the center of said disk portion to the edge of said disk portion, and said ribs are in the form of grooves.

18. The cleaning device of claim 16, wherein a plurality of ribs extend from the center of said disk portion to the edge of said disk portion, and said ribs are in the form of ridges.

19. The cleaning device of claim 16, wherein a plurality of ribs extend from the center of said disk portion to the edge of said disk portion, and a first portion of said ribs are in the form of grooves and a second portion of said ribs are in the form of ridges.

\* \* \* \* \*